(12) United States Patent
Stepien

(10) Patent No.: US 10,098,374 B2
(45) Date of Patent: Oct. 16, 2018

(54) METHODS AND APPARATUSES FOR PREPARING SPAGHETTI SQUASH

(71) Applicant: Growers Express, LLC, Salinas, CA (US)

(72) Inventor: Brian Stepien, Carmel, CA (US)

(73) Assignee: Growers Express, LLC, Salinas, CA (US)

( * ) Notice: Subject to any disclaimer, the term of this patent is extended or adjusted under 35 U.S.C. 154(b) by 0 days.

(21) Appl. No.: 15/265,416

(22) Filed: Sep. 14, 2016

(65) Prior Publication Data
US 2018/0070618 A1   Mar. 15, 2018

(51) Int. Cl.
| | | |
|---|---|---|
| *A23L 19/00* | (2016.01) | |
| *A23L 5/30* | (2016.01) | |
| *B65D 81/34* | (2006.01) | |
| *B65B 25/22* | (2006.01) | |

(52) U.S. Cl.
CPC .................. *A23L 19/09* (2016.08); *A23L 5/34* (2016.08); *B65B 25/22* (2013.01); *B65D 81/3461* (2013.01); *A23V 2002/00* (2013.01)

(58) Field of Classification Search
CPC ....... A23L 19/09; A23L 5/34; B65D 81/3461; B65B 25/22
See application file for complete search history.

(56) References Cited

PUBLICATIONS

Prepare and cook spaghetti squash, Your Lighter Side, [on line] May 15, 2007, retrieved on Jan. 4, 2018. Retrieved from the Internet: URL:<https://yourlighterside.com/2009/05/how-to-prepare-and-cook-spaghetti-squash/>.*
How to cook spaghetti squash, Pass The Plants, [on line] Jun. 2, 2014, retrieved Jan. 4, 2018. Retrieved from the Internet: URL:<https://passtheplants.com/how-to-cook-spaghetti-squash/>.*

* cited by examiner

*Primary Examiner* — Erik Kashnikow
*Assistant Examiner* — C A Smith
(74) *Attorney, Agent, or Firm* — Oblon, McClelland, Maier & Neustadt, L.L.P.

(57) ABSTRACT

A spaghetti squash package can include microwaveable packaging and instructions for spaghetti squash preparation including heating content of the microwaveable packaging and interacting with the content of the microwaveable packaging until noodles are formed.

8 Claims, 4 Drawing Sheets

METHODS AND APPARATUSES FOR PREPARING SPAGHETTI SQUASH

BACKGROUND

The "background" description provided herein is for the purpose of generally presenting the context of the disclosure. Work of each presently named inventor, to the extent it is described in this background section, as well as aspects of the description which may not otherwise qualify as prior art at the time of filing, is neither expressly nor impliedly admitted as prior art against the present invention.

Fruits and vegetables can be an important part of a balanced diet. However, for certain fruits and vegetables, it is difficult and/or time-consuming for the end user to process the fruit or vegetable from its naturally occurring form to a state where it is ready to eat. One example of such a food is spaghetti squash.

Spaghetti squash has a hard outer skin and a hard inner flesh before it is cooked. Thus, it is very difficult to cut spaghetti squash in order to prepare it for a meal. Alternatively, certain recipes call for microwaving the whole squash prior to preparation to make it easier to cut. The traditional method of cooking spaghetti squash is by roasting for an hour or more. However, this is obviously a time-consuming process and results in a very hot squash that is difficult to handle.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

A spaghetti squash package can include microwaveable packaging and instructions for spaghetti squash preparation including heating content of the microwaveable packaging and interacting with the content of the microwaveable packaging until noodles are formed. A method and device for preparing and packaging the spaghetti squash is also described.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
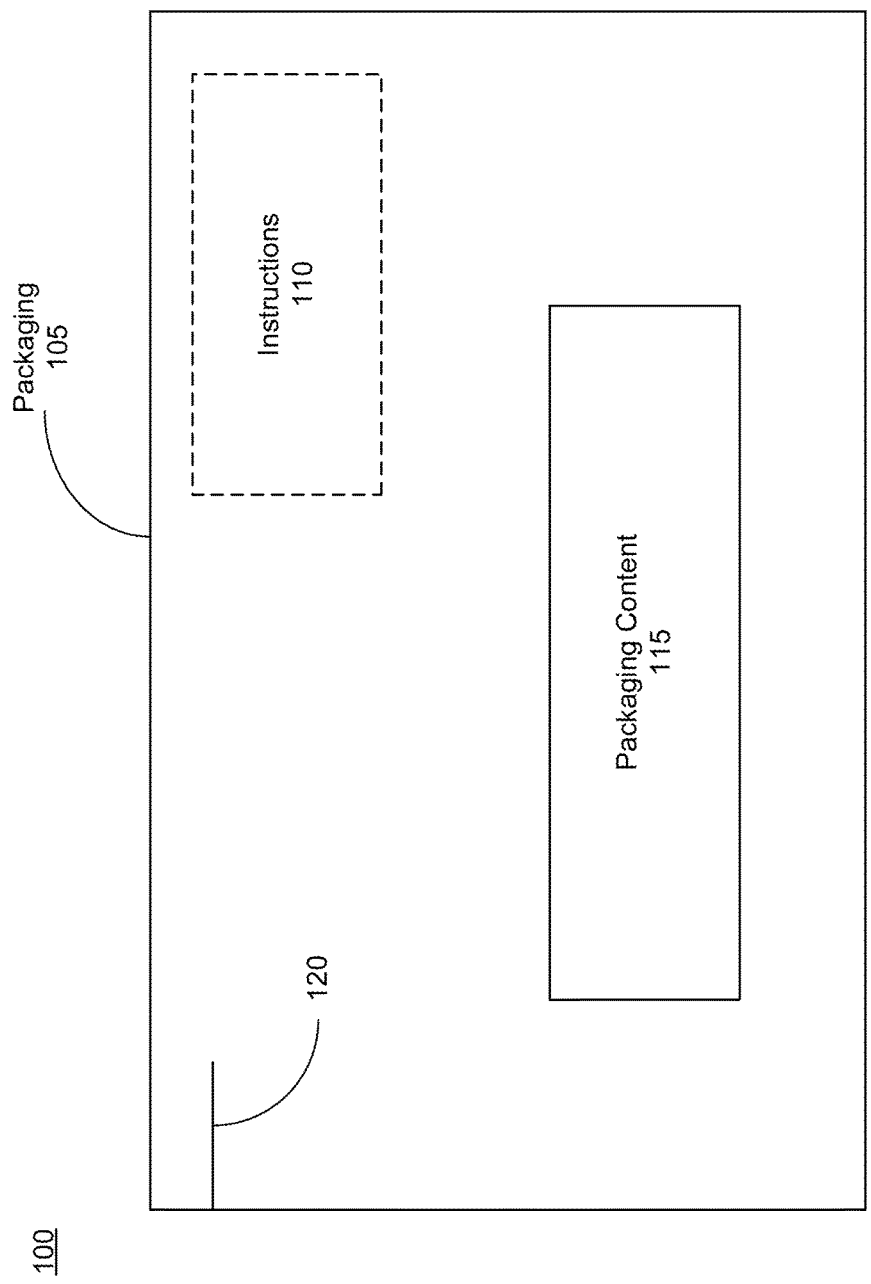
FIG. 1 is a block diagram of a spaghetti squash apparatus according to one or more aspects of the disclose subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more."

Referring now to the drawings, wherein like reference numerals designate identical or corresponding parts throughout the several views.

FIG. 1 is a block diagram of a package containing spaghetti squash (herein referred to as package 100) according to one or more aspects of the disclosed subject matter. The package 100 can include packaging 105, instructions 110, packaging content 115, and a tear notch 120.

The packaging 105 can be microwaveable packaging. The packaging 105 can be heated in the microwave, thereby heating any packaging content 115 in the packaging 105. For example, the packaging 105 can contain spaghetti squash as the packaging content 115, and when the packaging 105 is heated for a predetermined amount of time, the spaghetti squash in the packaging 105 is also heated. The amount of time the packaging 105 is heated, and therefore the amount of time the packaging content 115 is heated, can correspond to an amount of time in which the packaging content 115 (e.g., spaghetti squash) is cooked. However, in another aspect, the packaging 105 can be heated for various amounts of time based on a preference of a consumer of the packaging content 115. There may be a range of amounts of heating time including a minimum amount of time in which the packaging content 115 is able to reach a predetermined state (e.g., heated enough so that the spaghetti squash can be broken down into noodles). A maximum amount of heating time may include a time at which the packaging content 115 will be overcooked, will burn, an unsafe amount of heating occurs (e.g., the unsafe amount of heating being based on specifications of the packaging 105), and the like. The predetermined amount of heating time may be a recommended amount of heating time as described in the instructions 110.

The instructions 110 may include tearing the tear notch 120, heating the packaging content 115 of the microwaveable packaging, reducing the temperature of the packaging content 115, and interacting with the packaging content 115 of the microwaveable packaging until noodles are formed. For example, the packaging content 115 can be spaghetti squash. The spaghetti squash can be heated for the recommended amount of heating time. The instructions can include a predetermined amount of cooling time (i.e., reducing the temperature of the packaging content 115) for after the predetermined amount of heating time. The tear notch 120 may assist both appropriate heating and cooling of the packaging content 115. The spaghetti squash may then be interacted with. The interacting can include the end user placing his or her hands on the package and then squeezing one or more pieces of cooked spaghettis squash. As the spaghetti squash is interacted with, the one or more portions of the spaghetti squash will separate into noodles. Once the spaghetti squash is separated into noodles, the spaghetti squash is ready to be removed from the packaging 105. The spaghetti squash is then ready to eat or to be used in a recipe.

The instructions 110 can be displayed on any portion of the packaging 105. The instructions 110 can be displayed on an outer surface of the packaging 105. Alternatively, or additionally, the instructions 110 can be displayed on an inner surface of the packaging 105. The instructions 110 can include letters, words, symbols, numbers, figures, and the like, or any combination thereof. Further, the instructions 110 can be displayed on any one or more additional packaging containing the packaging 105.

The packaging content 115 may include at least one portion of spaghetti squash, wherein the at least one portion can be a plurality of pieces of spaghetti squash (e.g., cubed). Alternatively, the at least one portion of spaghetti squash can be an individual piece of spaghetti squash. Each packaging content 115 may have a corresponding set of instructions 110 based on the size of each portion, the total weight, and the like.

The tear notch 120 may be a portion of the packaging 105 that is easily torn a predetermined amount allowing a portion of the packaging 105 to be open for various reasons as further described herein. The tear notch 120 can include a notch in a side or both sides of the packaging. The tear notch 120 can include, in addition to or instead of the side notch(es), a regular perforation extending across the top of the packaging 105.

Figure 2:
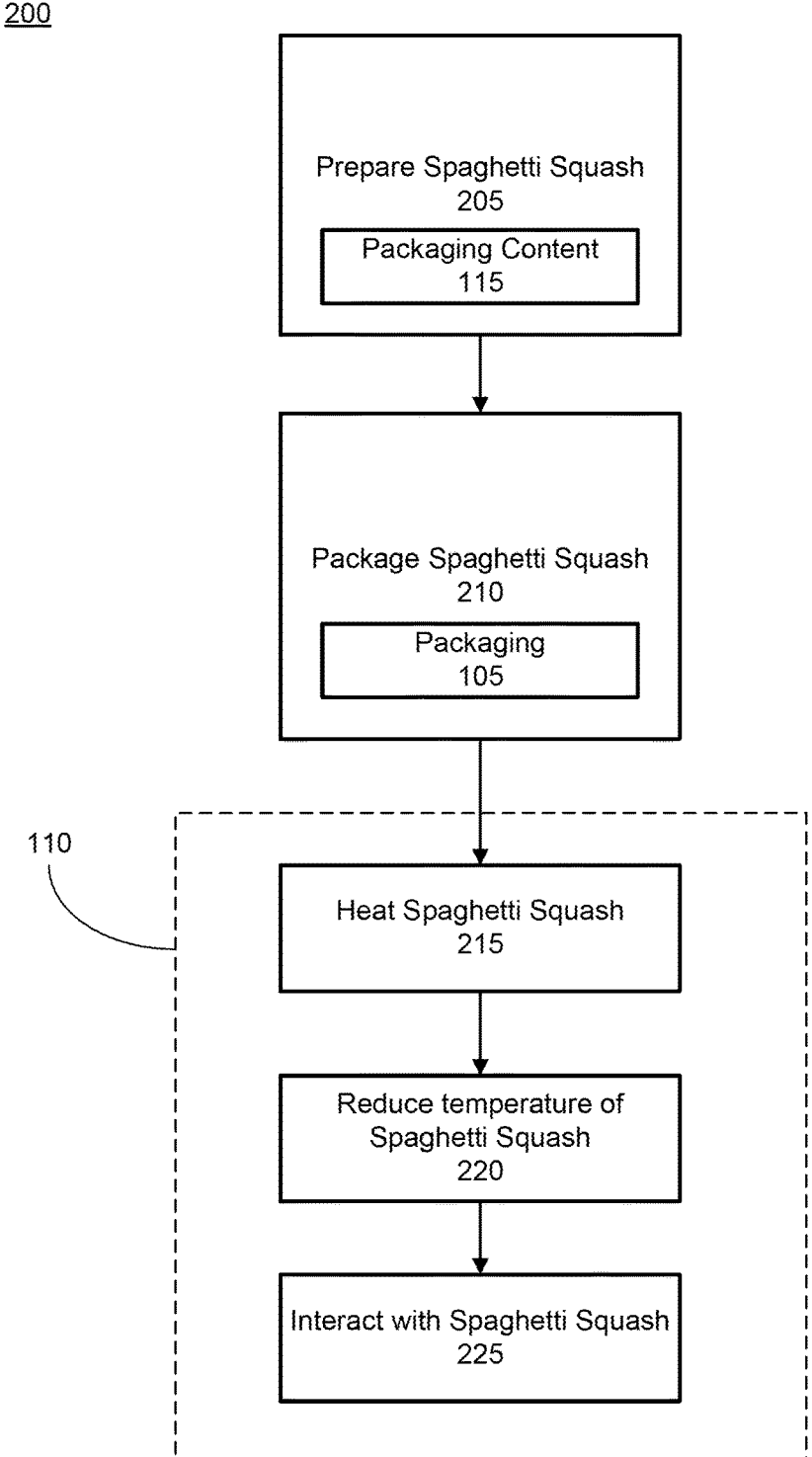
FIG. 2 is a work flow of spaghetti squash preparation according to one or more aspects of the disclosed subject matter.

FIG. 2 is a workflow 200 of spaghetti squash preparation using package 100 according to one or more aspects of the disclosed subject matter.

Preparing spaghetti squash 205 can include various aspects of preparing the spaghetti squash for packaging. For example, preparing the spaghetti squash 205 can include washing, halving, seeding, peeling, cutting, cubing, and the like. The preparing can start with the spaghetti squash in the state in which it is harvested from the plant. Alternatively, some washing and other preparation can be done to the spaghetti squash. Preparing the spaghetti squash can be done by one or more machines that are able to spin a fruit or vegetable vertically or horizontally to peel and cut the spaghetti squash, as would be known by one or ordinary skill in the art. Preparing the spaghetti squash 205 can result in the packaging content 115.

Packing the spaghetti squash 210 can include placing a predetermined amount of the packaging content 115 into the packaging 105. The packaging 105 can be microwaveable packaging. Additionally, the packaging 105 can be a stand up pouch with dimensions based on the weight of the packaging content 115 and/or a pillow bag, for example. Alternatively, or additionally, the packing 105 can be a standup gusseted pouch, microwaveable rigid plastic container, and/or shrink or flow wrapped.

Packaging the spaghetti squash 210 can include separating and weighing the spaghetti squash portions for each package 100. A multi-head weigher can separate and weigh a predetermined amount of spaghetti squash and feed each portion into a pouch or clamshell filler, for example, as would be known by one or ordinary skill in the art. A preferred range of weight for each packaging content 115 for an individual package 100 can be from 8 oz. to 1 lb. However, it could be considered that the weight could be less than 8 oz. or more than 1 lb.

From the workflow 200, after the spaghetti squash is packaged, the spaghetti squash is heated 215 and the heating may include tearing the tear notch 120 as part of the heating section of the workflow 200, temperature is reduced 220, and then spaghetti squash interaction 225 can occur in accordance with the instructions 110.

Spaghetti squash heating 215 can include microwaving the packaging 105, and therefore the packaging content 115, for a predetermined amount of time. The instructions 110 included on the packaging 105 can be consistent with validated studies at specific microwave parameters (e.g., such as the factory settings of a microwave that a consumer might use) to achieve a tenderness (e.g., softness or ability to break down into "noodles") of the spaghetti squash. A range of heating times could be 5 minutes to 12 minutes. More preferably, a recommended heating time can be 5 minutes for a package of 8-10 ounces. However, the recommended heating time can vary based on the weight of the packing content 115. In one aspect, the recommended heating time does not include the time the product should be left to sit before further interaction, as the product can continue to cook during the interval of time in which the product is left to sit after being heated. The range of heating times and/or the recommended heating time can be displayed on the packaging independently or as part of the instructions 110.

Reducing the temperature 220 of the spaghetti squash can include leaving the packaging 105 to sit, for example in the microwave after heating is complete or on a counter away from a heat source, for a predetermined amount of time (e.g., 2 minutes). Additionally, an aspect of the temperature reduction 220 can include the tear notch 120 in the packaging 105 which can be opened a predetermined amount prior to heating 215 to allow steam to escape, which can also assist in the cooling 220 by allowing heat to escape the packaging 105.

Spaghetti squash interaction 225 can include squeezing, for example using fingers to squeeze, portions of the packaging content 115 of the packaging 105 until noodles are formed. Additionally, the packaging content 115 can remain in the packaging 105 for the duration of the interaction. In another aspect, the interaction can occur when the packaging content 115 is removed from the packaging 105. The recommended spaghetti squash interaction 225 can be displayed on the packaging 105 independently and/or as part of the instructions 110.

In an exemplary embodiment, the instructions 110 include opening the packaging 105 a predetermined amount via the tear notch 120 (e.g., the tear notch 120 can be opened within a range of one-half inch to one inch) before heating the spaghetti squash 215 (e.g., microwaved in a 1000 watt microwave for 5 minutes). The packaging 105, and therefore the spaghetti squash in the packaging 105, can be left to cool for a predetermined amount of time, such as 2 minutes, for example, prior to the spaghetti squash interaction 225. Optionally, the interval of time in which the spaghetti squash is left to cool can be included in an overall cooking time as the spaghetti squash can continue to cook due to the residual heat while cooling 220. However, the time for spaghetti squash heating 215 in the instructions 110 is the specific time in which the spaghetti squash should be heated by an outside source, such as a microwave, because the additional cooking experienced during the time in which the temperature is reduced 220 can be previously factored in to the ideal cooking time for the spaghetti squash. After spaghetti squash temperature has been reduced 220, the spaghetti squash interaction 225 can occur. In one aspect, the spaghetti squash interaction 225 can occur via an end user of the product by manipulating the packaging with one or more hands and/or fingers and/or thumbs to break the packaging content 115 (e.g., chunks of spaghetti squash) into spaghetti squash noodles.

In an exemplary embodiment, the heating of the spaghetti squash 215 and the spaghetti squash interaction 225 are both performed by the end user, such as a consumer in their home or a chef in a restaurant. Optionally, in one aspect, the spaghetti squash can be pre-cooked so that the user can heat 215 the spaghetti squash for a shorter amount of time before spaghetti squash interaction 225 (e.g., breaking the chunks of spaghetti squash into noodles). For example, pre-cooked spaghetti squash may be applicable to frozen or vacuum packaged spaghetti squash, which can be considered in a category of "ready to eat" products.

Figure 3:
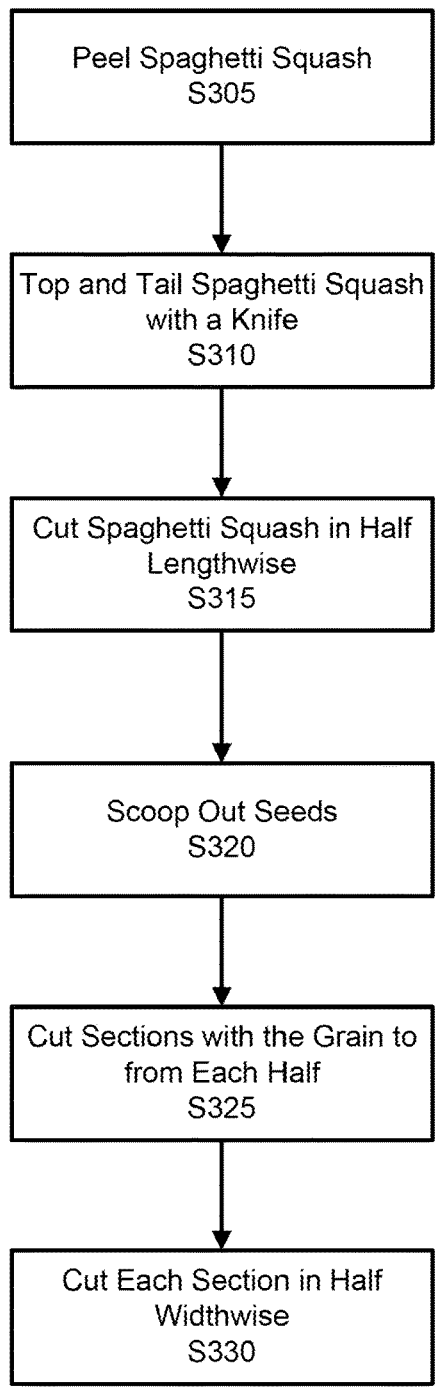
FIG. 3 is a flow chart for a method of preparing spaghetti squash for packaging.

FIG. 3 is a work flow for spaghetti squash preparation 205. In S305, the spaghetti squash can be peeled. The spaghetti squash can be placed in a peeling machine, such as a rotary peeler or other commercial or industrial peeler, which secures the spaghetti squash on each end of the spaghetti squash. The peeling machine can rotate the spaghetti squash on an axis at least substantially parallel to a longitudinal axis of the spaghetti squash. While rotating, the skin of the spaghetti squash can contact a sharp surface, such as a knife blade, and be peeled as would be known by one of ordinary skill in the art.

In S310, the peeled spaghetti squash can be topped and tailed with a knife. To top and tail can be to cut off a portion of each end of the spaghetti squash such that each end of the spaghetti squash is flat. Additionally, the topping and tailing of the spaghetti squash can remove portions of the spaghetti squash that may still have spaghetti squash skin remaining after being peeled by the peeling machine.

In S315, the spaghetti squash, which is now topped and tailed in addition to being peeled, can be cut in half lengthwise (e.g., with a knife) resulting in a first half and a second half of the spaghetti squash.

In S320, the seeds can be removed (e.g., scooped out) from the first half and the second half of the spaghetti squash.

In S325, the first half and the second half can be cut into sections with a knife, for example. The sections can be cut with the grain of the spaghetti squash. Each section can be cut so that the sections can range from one and one half inches to two inches in width.

In S330, each section can be cut in half with a knife, for example, resulting in two portions from each section. The portions can be approximately 1.5-by-2.5 inches. However, it should be appreciated that the size of each portion can range significantly based on the size of the spaghetti squash, the area of the spaghetti squash from which each section originated, and the like. Each portion can then be packaged, as in packaging the spaghetti squash 210 shown in FIG. 2, such that the one or more portions correspond to a predetermined weight and are placed (e.g., by hand or machine) into a predetermined packaging 105.

Figure 4A:
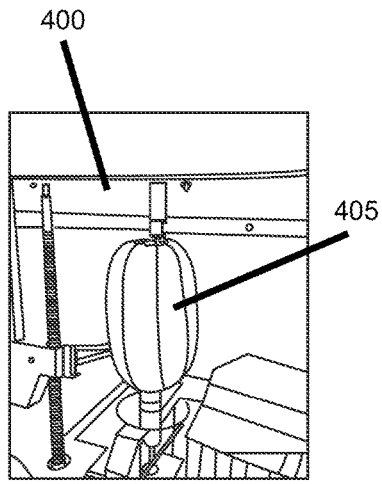
FIG. 4A depicts a spaghetti squash peeling machine according to one or more embodiments of the disclosed subject matter.

FIG. 4A depicts a spaghetti squash peeling machine 400 according to one or more embodiments of the disclosed subject matter. The spaghetti squash peeling machine 400 can secure a spaghetti squash 405 in a vertical position by holding each end of the spaghetti squash 405. The spaghetti squash peeling machine 400 can peel the spaghetti squash 405 by rotating the spaghetti squash 405, as would be known by one of ordinary skill in the art.

Figure 4B:
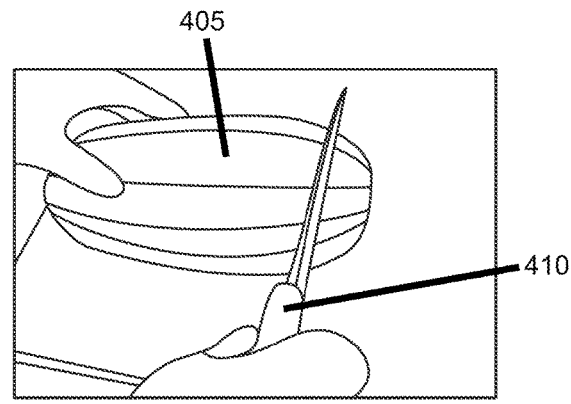
FIG. 4B depicts toping and tailing of a spaghetti squash with a knife according to one or more embodiments of the disclosed subject matter.

FIG. 4B depicts the toping and tailing of the spaghetti squash 405 with a knife 410, according to one or more embodiments of the disclosed subject matter, as described in more detail in S310 of FIG. 3.

Figure 4C:
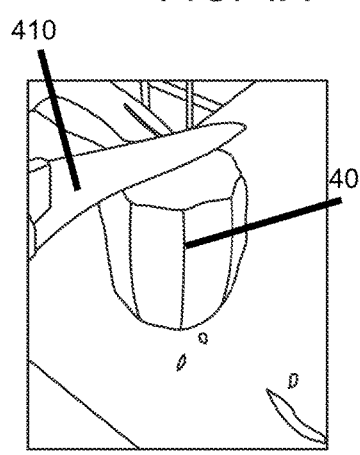
FIG. 4C depicts a spaghetti squash being cut in half lengthwise with a knife according to one or more aspects of the disclosed subject matter.

FIG. 4C depicts the spaghetti squash 405 being cut in half length wise with the knife 410, according to one or more embodiments of the disclosed subject matter, as described in S315 of FIG. 3.

Figure 4D:
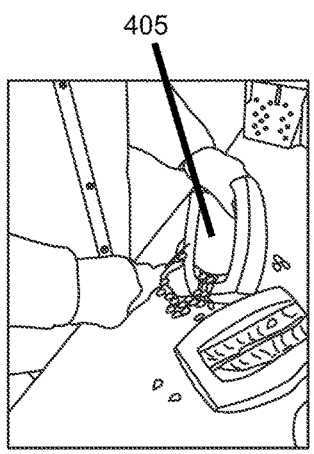
FIG. 4D depicts the seeds of a spaghetti squash being scooped out of the spaghetti squash according to one or more aspects of the disclosed subject matter.

FIG. 4D depicts the seeds of the spaghetti squash 405 being scooped out of the spaghetti squash 405 according to one or more aspects of the disclosed subject matter.

Figure 4E:
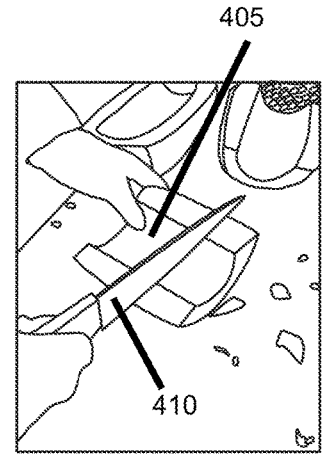
FIG. 4E depicts a half of spaghetti squash being cut into sections according to one or more embodiments of the disclosed subject matter.

FIG. 4E depicts a half of the spaghetti squash 405 being cut into sections, according to one or more embodiments of the disclosed subject matter, the sections being cut with the grain as described in S325 of FIG. 3.

Figure 4F:
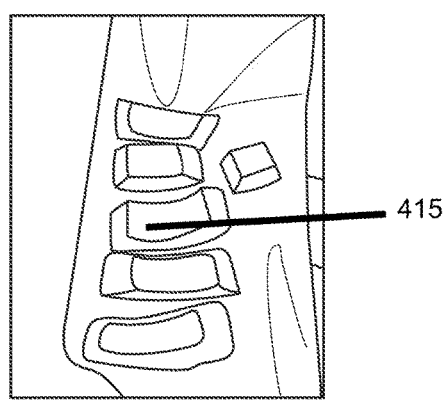
FIG. 4F depicts each of the sections being cut in half to create one or more portions of spaghetti squash according to one or more embodiments of the disclosed subject matter.

FIG. 4F depicts each of the sections being cut in half, with the knife 410, for example, to create one or more portions 415 of spaghetti squash 405, according to one or more embodiments of the disclosed subject matter. The portions 415 can be 1.5 inches by 2.5 inches, for example. However, it should be appreciated that the portions 415 can range in size.

Figure 5:
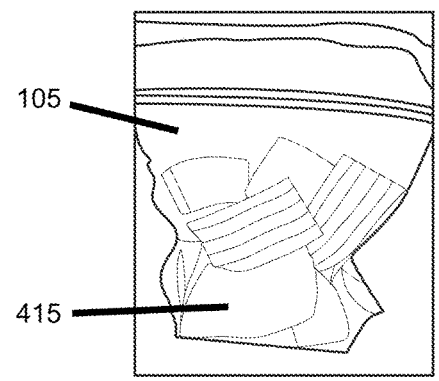
FIG. 5 depicts one or more portions of spaghetti squash in the packaging according to one or more aspects of the disclosed subject matter.

FIG. 5 depicts one or more portions 415 of the spaghetti squash 405 in the packaging 105 according to one or more aspects of the disclosed subject matter.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method of processing a spaghetti squash, comprising:
preparing the spaghetti squash for microwaveable packaging, wherein the preparing the spaghetti squash for microwaveable packaging includes
removing a skin of the spaghetti squash, and
cutting the spaghetti squash into spaghetti squash portions;
packaging the spaghetti squash portions in the microwaveable packaging, a predetermined number of spaghetti squash portions being packaged in the microwaveable packaging based on weight, the microwaveable packaging including instructions for manipulating spaghetti squash portions to form noodles displayed on the microwaveable packaging;
heating the spaghetti squash portions in the microwaveable packaging;
cooling the spaghetti squash portions in the microwaveable packaging; and
interacting with the spaghetti squash portions in the microwaveable packaging until noodles are formed.

2. The method of claim 1, wherein the heating the spaghetti squash includes microwaving the microwaveable packaging containing the spaghetti squash portions for a predetermined amount of heating time.

3. The method of claim 1, wherein the interacting includes using fingers to squeeze the spaghetti squash portions the noodles are formed.

4. The method of claim 3, wherein the spaghetti squash portions remain in the microwaveable packaging for the duration of the interacting.

5. The method of claim 1, wherein each of the spaghetti squash portions is substantially 1.5 inches by 2.5 inches.

6. The method of claim 1, wherein the predetermined number of spaghetti squash portions is at least three spaghetti squash portions.

7. The method of claim 1, wherein the preparing the spaghetti squash for microwaveable packaging includes cooking the spaghetti squash prior to packaging the spaghetti squash portions.

8. The method of claim 1, wherein the preparing the spaghetti squash for microwaveable packing includes topping and tailing the spaghetti squash.

* * * * *